US011517809B2

(12) United States Patent
Higuchi et al.

(10) Patent No.: US 11,517,809 B2
(45) Date of Patent: Dec. 6, 2022

(54) GAME DEVICE, PROGRAM PRODUCT, GAME SYSTEM AND ARTICLE FOR GAMES

(71) Applicant: BANDAI CO., LTD., Tokyo (JP)

(72) Inventors: Wataru Higuchi, Tokyo (JP); Reina Fukuoka, Tokyo (JP); Satoshi Takeda, Tokyo (JP); Yuki Kadota, Tokyo (JP); Kenichiro Kobayashi, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 469 days.

(21) Appl. No.: 16/707,878

(22) Filed: Dec. 9, 2019

(65) Prior Publication Data
US 2020/0114251 A1 Apr. 16, 2020

Related U.S. Application Data

(63) Continuation of application No. PCT/JP2018/014141, filed on Apr. 2, 2018.

(30) Foreign Application Priority Data

Jun. 12, 2017 (JP) .............................. JP2017-115384

(51) Int. Cl.
*A63F 3/00* (2006.01)
*A63F 13/30* (2014.01)
(Continued)

(52) U.S. Cl.
CPC .......... *A63F 3/00643* (2013.01); *A63F 13/30* (2014.09); *A63F 13/69* (2014.09);
(Continued)

(58) Field of Classification Search
None
See application file for complete search history.

(56) References Cited

U.S. PATENT DOCUMENTS 5,190,285 A * 3/1993 Levy ..................... A63F 7/0664
463/43
5,853,327 A * 12/1998 Gilboa .................. A63F 13/235
273/237

(Continued)

FOREIGN PATENT DOCUMENTS

JP H06-154421 A 6/1994
JP 2002153675 A * 5/2002
(Continued)

OTHER PUBLICATIONS

English Translation of JP 2016077550 A, May 19, 2022, http://translationportal.epo.org/emtp/translate/?ACTION=description-retrieval&COUNTRY=JP&ENGINE=google&FORMAT=docdb&KIND=A&LOCALE=en_EP&NUMBER=2016077550&OPS=ops.epo.org/3.2&SRCLANG=ja&TRGLANG=en, pp. 1-20 (Year: 2022).*

(Continued)

*Primary Examiner* — Tramar Harper
(74) *Attorney, Agent, or Firm* — Rabin & Berdo, P.C.

(57) ABSTRACT

A game device includes a board surface configured to allow articles of a first type and a second type to be placed, and for the articles of the first type and the second type placed on the board surface, acquires first game information associated with the article of the first type or second game information associated with the article of the second type. The device executes a game based on the acquired first game information, and changes a state of acquisition of information from an article on the board surface to one of a first state and a second state according to the progress of the game, the first state in which the first game information is acquired from the article of the first type, the second state in which the second game information is acquired from the article of the second type.

12 Claims, 6 Drawing Sheets

(51) Int. Cl.
    *A63F 13/69*    (2014.01)
    *A63F 13/80*    (2014.01)
    *A63F 13/92*    (2014.01)
    *A63F 13/95*    (2014.01)

(52) U.S. Cl.
    CPC .............. *A63F 13/80* (2014.09); *A63F 13/92* (2014.09); *A63F 13/95* (2014.09)

(56) References Cited

U.S. PATENT DOCUMENTS

| | | | | |
|---|---|---|---|---|
| 6,484,942 | B1* | 11/2002 | Yokoyama | A63F 3/00075 235/462.03 |
| 2003/0171142 | A1* | 9/2003 | Kaji | A63F 13/02 463/11 |
| 2004/0152521 | A1* | 8/2004 | Shinoda | G07F 17/32 463/43 |
| 2004/0248650 | A1* | 12/2004 | Colbert | A63F 13/08 463/37 |
| 2006/0003843 | A1* | 1/2006 | Kobayashi | A63F 13/60 463/43 |
| 2006/0160607 | A1* | 7/2006 | Okada | G07F 17/3255 463/20 |
| 2006/0175753 | A1* | 8/2006 | MacIver | A63F 3/00643 463/43 |
| 2007/0015588 | A1* | 1/2007 | Matsumoto | A63F 13/214 463/43 |
| 2007/0062852 | A1* | 3/2007 | Zachut | A63F 3/00643 209/683 |
| 2007/0207853 | A1* | 9/2007 | Ieizumi | A63F 13/08 463/24 |
| 2007/0211047 | A1* | 9/2007 | Doan | G06F 3/0393 345/419 |
| 2010/0056281 | A1* | 3/2010 | Uchiyama | A63F 13/812 463/43 |
| 2011/0086702 | A1* | 4/2011 | Borst | A63F 13/44 463/30 |
| 2011/0263338 | A1* | 10/2011 | Horie | A63F 1/04 463/43 |
| 2012/0231867 | A1* | 9/2012 | Dimitriadis | G07F 17/326 463/19 |
| 2012/0295703 | A1* | 11/2012 | Reiche | A63F 13/235 463/31 |
| 2013/0303047 | A1* | 11/2013 | Albert | A63H 33/00 446/175 |
| 2013/0324262 | A1* | 12/2013 | Shimohata | A63F 13/95 455/41.2 |
| 2014/0256430 | A1* | 9/2014 | Matsumura | A63F 13/25 463/31 |
| 2015/0328541 | A1* | 11/2015 | Van Haaften | A63F 1/02 463/42 |
| 2018/0028904 | A1* | 2/2018 | Burton | G07F 17/3209 |

FOREIGN PATENT DOCUMENTS

| | | |
|---|---|---|
| JP | 2015-013201 A | 1/2015 |
| JP | 2015-226634 A | 12/2015 |
| JP | 2016-077550 A | 5/2016 |
| JP | 2016-174941 A | 10/2016 |
| JP | 2017-012766 A | 1/2017 |
| JP | 2017-074261 A | 4/2017 |

OTHER PUBLICATIONS

English Translation of JP 2002153675 A, May 19, 2022, http://translationportal.epo.org/emtp/translate/?ACTION=description-retrieval&COUNTRY=JP&ENGINE=google&FORMAT=docdb&KIND=A&LOCALE=en_EP&NUMBER=2002153675&OPS=ops.epo.org/3.2&SRCLANG=ja&TRGLANG=en, pp. 1-5 (Year: 2022).*

* cited by examiner

GAME DEVICE, PROGRAM PRODUCT, GAME SYSTEM AND ARTICLE FOR GAMES

CROSS REFERENCES TO RELATED APPLICATIONS

This is a continuation application of International Application PCT/JP2018/014141 filed on Apr. 2, 2018 which claims priority from a Japanese Patent Application No. 2017-115384 filed on Jun. 12, 2017, the contents of which are incorporated herein by reference.

BACKGROUND OF THE INVENTION

Technical Field

The present invention relates to a game device, a program, a game system and an article for games, and particularly relates to a game device that provides a play experience of a game based on information acquired from an article.

Background Art

There is a game device that allows a card labeled with a code to be read, and provides a user with a play experience of a game in which a character associated with the card appears (PTL 1). In recent years, a game device has been presented which enables acquisition of information from multiple pieces of cards in a single game play, and provides a game play in which multiple bodies of characters associated with the cards appear similarly to the technique described in PTL 1.

CITATION LIST

Patent Literature

PTL 1: Japanese Unexamined Patent Application Publication No. 06-154421

SUMMARY OF THE INVENTION

Meanwhile, in a game device that uses a card itself as an operational interface of a game, it is possible to provide a play experience having higher interactive performance, for example, by detecting information such as the position and rotation, or movement and a movement velocity of a card placed on a board surface in real-time. In such a game device, in order to improve the interactive performance, usable cards are each labeled with a code which is encoded in a specific format (the same format) as in PTL 1 so that the states of multiple cards are detectable in a short period.

In contrast, in order to diversify elements of interest provided to users, a game device has been presented which enables acquisition of information from articles of multiple types, labeled with codes in different formats. In such a game device, however, a user is forced to perform complicated operations related to the acquisition of information, such as differentiating reading devices which perform the acquisition of information from the articles of the types, and such as causing a user to determine the format in which an article has a code, and to place the article on a corresponding reading device.

To cope with this, when acquisition of information is attempted to be performed by the same reading device, at the time of acquisition of information, processing, such as detection of each type and decoding of a code, is necessary, and a calculation amount is increased as a result, thus there is a possibility that the interactive performance of a game is reduced.

The present invention has been devised in consideration of the above-described problem, and it is an object to provide a game device, a program, a game system and an article for games that guarantee a favorable play experience in the game device that enables acquisition of information from articles of multiple types.

In order to achieve the above-described object, the game device of the present invention includes: a board surface configured to allow an article of a first type and an article of a second type different from the article of the first type to be placed; an acquisition means that, for the article of the first type and the article of the second type placed on the board surface, acquires first game information associated with the article of the first type or second game information associated with the article of the second type; an execution means that executes a game based on the first game information acquired by the acquisition means; and a setting means that sets the acquisition means to one of a first state and a second state, the first state in which the first game information is acquired from the article of the first type, the second state in which the second game information is acquired from the article of the second type.

Advantageous Effects of Invention

Because of such a configuration, according to the present invention, it is possible to guarantee a favorable play experience in the game device that enables acquisition of information from articles of multiple types.

BRIEF DESCRIPTION OF THE DRAWINGS

FIGS. 6A-6D are diagrams each showing the configuration of various types of data used in the game system according to the embodiment of the present invention.

DESCRIPTION OF THE PREFERRED EMBODIMENTS

[Embodiment] Hereinafter an exemplary embodiment of the present invention will be described in detail with reference to the drawings. It is to be noted that in an embodiment described below, an example will be explained in which the present invention is applied to a game device, as an instance of game device, that is configured to enable acquisition of information from articles of two different types. However, the present invention is applicable to any device that enables acquisition of information from articles of two or more different types.

A description is given assuming that the articles from which information is acquirable are of the two types in the following. The first type is a game card as the article of the first type according to the present invention, and is configured to enable execution of a game, in which a game element (for example, a character) associated with the card appears, in the game device by performing acquisition of information. The other type is a ticket as the article of the second type according to the present invention, and the ticket does not have an associated game element, and is configured to enable execution of a sub-game (drawing game) not provided by a normal game play when acquisition of information is performed. Also, the game device is configured to enable provision of the game card (the article of the first type) between the articles configured to enable acquisition of information in this manner, and does not provide a ticket (the article of the second type). The ticket is a so-called promotion (sales promotional) product provided as a store handout or an accompanying merchandise, and an experience having a specific element of interest is provided in the game device by using (acquiring information from the ticket during utilization of the game device) the ticket.

The articles of two types are coded by converting added information (game information) in different formats, and are described as objects which have different processing and means required for acquisition at the time of acquisition of information from the articles. In the present embodiment, addition of information to an article is described as being achieved by adding codes in different formats for relevant game information to the article surface by printing.

Figure 4A:
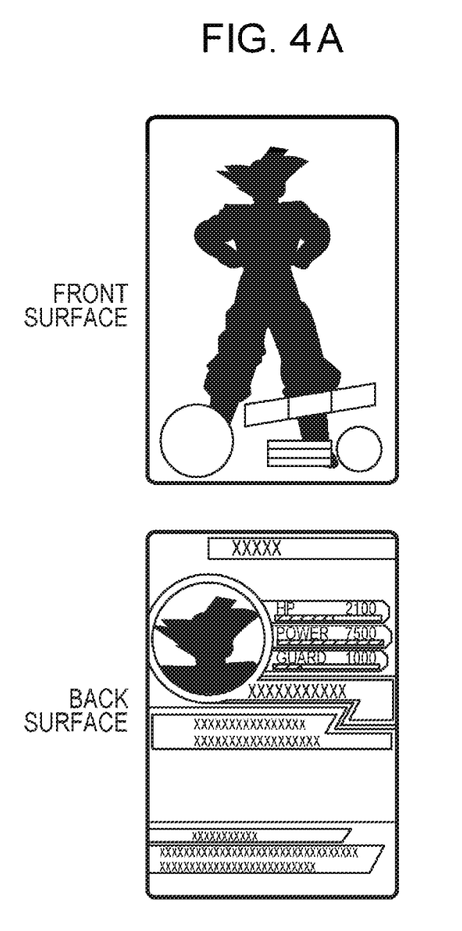
FIGS. 4A and 4B are illustrations for explaining usable articles in the game device 100 according to the embodiment of the present invention.

A game card is labeled with a code on each of its front surface and back surface so that which surface is in contact with a placement surface can be determined based on the code which includes, for example, a card ID that can uniquely identifies the card and a character ID that uniquely identifies a character which is a game element associated with the card. As described later, in a game device 100 of the present embodiment, in order to enable an operational input regarding a game by performing a movement operation on multiple game cards on a placement panel, a two-dimensional code is printed on each game card, the two-dimensional code in a format configured to facilitate detection of at least one of a position, rotation, and movement with a small calculation amount. Also, to make an associated character visually recognizable, the game card is formed by printing a character image of the character thereon, and provides an element of interest related to article collection of game contents. Therefore, in the present embodiment, printing of a code on the game card is performed by using an invisible ink as illustrated in FIG. 4A so as not to mar the beauty of the article. It is to be noted that a description is given assuming that a game element associated with the game card is a character in the present embodiment. However, the implementation of the present invention is not limited to this, and needless to say, a game element associated with the game card may be another element, such as an item, a generated effect.

Figure 4B:
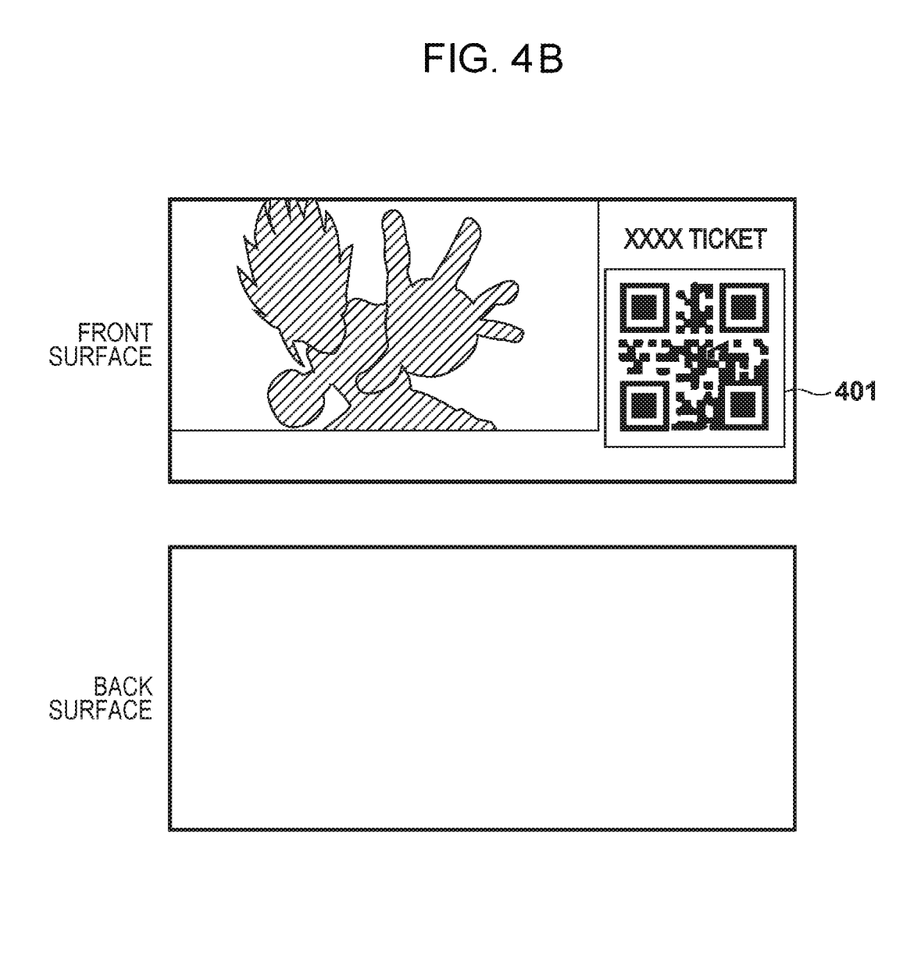

In contrast, for a ticket, for example, a ticket ID which can uniquely identify the ticket is labeled on one surface of the ticket. In the game device 100 of the present embodiment, acquisition of information from the ticket is performed on the placement panel similarly to the game card. However, in contrast to the game card, the ticket is not used for an operational input regarding a game, thus a code in a format which simply enables acquisition of information is sufficient. In other words, a code labeled on the ticket does not need to have a format which facilitates detection of movement etc. Also, the ticket may be an article used for sales promotion in a predetermined period, such as a campaign, for example, and has an aspect which is used for providing an additional element of interest in the game device. Therefore, in contrast to the game card provided for each character, the ticket does not need to have a variety of types, and is not an article presumed to be collected, thus it is preferable to maintain the manufacturing cost to a low price, and printing of a code 401 on the ticket is performed by using an invisible ink to clearly show the surface on which acquisition of information is performed as illustrated in FIG. 4B.

Also, in the present embodiment, a description is given assuming that the article of the first type provided by the game device, and the additional article of the second type configured to enable the game device to acquire information are the game card and the ticket. However, as described later, the article is not limited to this if game information is added to the article in formats for which processing and means required for acquisition are different. For example, if the article of the first type is an article configured to enable identification of a game element associated with the article, the article may be a created object, such as a figure, a toy, a key holder, which has an exterior appearance of a game element. Also, for example, the article of the second type may be an object to which game information converted in a format different from that of the article of the first type is labeled, and requires processing different from that of the article of the first type at the time of acquisition of information. When the article is a created object, game information may be acquired from a recording medium inside the created object, or part of the exterior appearance such as a coating, a seal, a printed character labeled to the created object. Also, the article may be not only a created object, but may be any article such as a paper medium or a seal other than the game card and the ticket.

<<Configuration of Game System>>

Here, the system configuration of the game system according to the embodiment of the present invention will be described using FIG. 1. As illustrated, the game system is configured to enable communication between a server 200 and each of multiple game devices 100 via a network 300. It is to be noted that in the description below, for the components implementing a similar function in each game device 100 and the server 200, the latter component is labeled with the leading character of "server" and distinguished.

<Configuration of Game Device 100>

Figure 2:
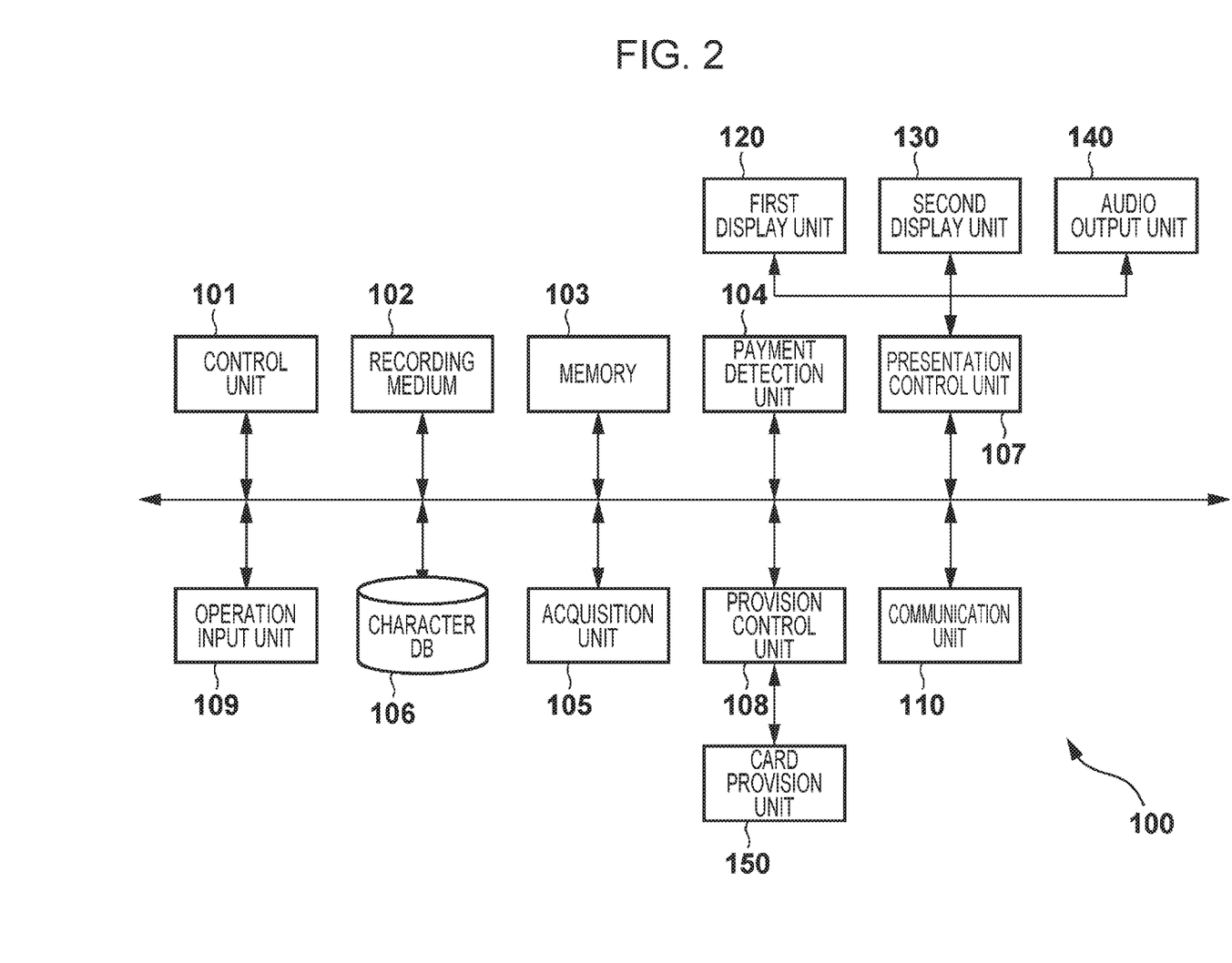
FIG. 2 is a diagram showing the functional configuration of a game device 100 according to the embodiment of the present invention.

First, the functional configuration of the game device 100 will be described using the block diagram of FIG. 2.

A control unit 101 is, for example, a CPU, and controls the operation of the blocks included in the game device 100. Specifically, the control unit 101 controls the operation of each block by reading an operation program of each block recorded on a recording medium 102, loading the program into a memory 103 and executing the program.

The recording medium 102 is a recording device, such as a non-volatile memory or a HDD, capable of holding data permanently. In addition to the operation program of each block included in the game device 100, the recording medium 102 stores information such as a parameter necessary for the operation of each block, and various types of graphic data used for games executed by the game device 100. The memory 103 is a recording device used for temporary data storage such as a volatile memory, for example. The memory 103 is used not only as a loading area for the operation program of each block, but also as a storage area which temporarily stores data or the like outputted in the operation of each block.

A payment detection unit 104 detects that payment of a fee is made in the game device 100. Payment of a fee may be determined by detecting, for example, insertion of a predetermined amount of hard cash or a corresponding coin into an input slot for hard cash, or completion of settlement processing based on communication with a chip related to a predetermined electronic money. A description is given assuming that the game device 100 of the present embodiment starts services for provision of a game card to a user based on payment of a fee. However, the payment of a fee is not an indispensable requirement, and the services may be started based on a predetermined start instruction.

A presentation control unit 107 manages to control presentation of various types of information to a user in the game device 100. A description is given assuming that the game device 100 of the present embodiment has a first display unit 120 and a second display unit 130 that display an image (such as a game screen, a menu screen), and an audio output unit 140 that performs audio output as the means for presentation of various types of information to a user. However, the means for presentation of information are not limited to these, and needless to say, substitution or addition may be made.

The presentation control unit 107 includes, for example, a drawing device such as a GPU, and performs predetermined drawing processing when an image to be displayed on the first display unit 120 and the second display unit 130 is generated. Specifically, the presentation control unit 107 executes appropriate calculation processing for a necessary object for drawing and performs drawing of an image based on processing or a command performed by the control unit 101 during an operation (during a game play and during stand-by state) of the game device 100. The generated image is outputted to the first display unit 120 or the second display unit 130 which may be a display device connected within the same housing for the game device 100 or detachably connected to the outside of the game device 100, and is displayed in a predetermined display area and presented to a user.

Figure 1:
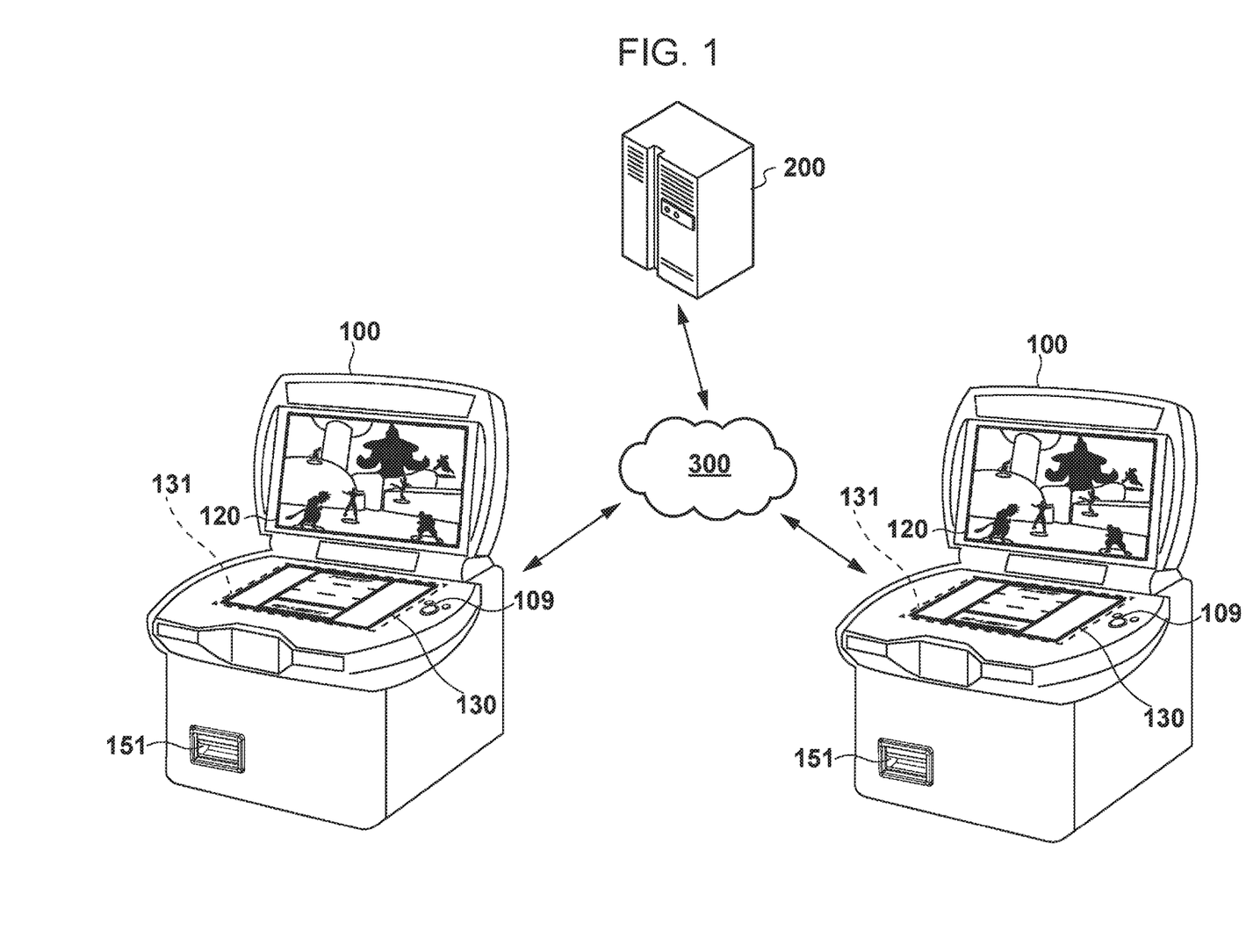
FIG. 1 is an illustration showing the system configuration of a game system according to an embodiment of the present invention.

The game device 100 of the present embodiment has two kinds of display devices (the first display unit 120 and the second display unit 130) as illustrated in FIG. 1 that display a game screen, and the presentation control unit 107 generates a game screen for each display device. As illustrated, in the present embodiment, the second display unit 130 is configured to have a board surface (placement panel 131) on its display area, the board surface allowing a game card and a ticket to be placed thereon. A user can input part of an operation related to a character action by performing a movement operation on a game card placed on the placement panel 131 in a sequence (strategy phase) related to a character operation. Also, a user can start provision of an element of interest associated with a ticket by placing the ticket on the placement panel 131 in a sequence related to ticket reading. It is possible to place the game card and the ticket at the same time on the placement panel 131, and in each sequence, acquisition of information and detection of a state of a relevant article are performed.

It is to be noted that in a sequence related to a character operation, a game screen including an image (two-dimensional image configured to clearly show the position and the area where the game card is placed) of a field which serves as a reference for placing the game card as illustrated in FIG. 1 is presented on the second display 130. At this point, in response to a movement operation for the game card on the placement panel 131, the manner in which arrangement of a character corresponding to the game card in the game field is changed is presented to a user by displaying a game screen on the first display unit 120, the game screen being displayed from the eye point for viewing the character and other characters who appear in the game.

Also, the second display unit 130 of the present embodiment is configured to display the game screen in transition and to enable the later-described acquisition unit 105 to acquire an invisible code labeled to the game card placed on the placement panel 131 and a visible code labeled to the ticket. For example, when the second display unit 130 is a liquid crystal display device, a configuration may be adopted in which a light transmissive liquid crystal layer and a light guiding layer are provided in a lower layer of the placement panel 131, and a light source is arranged in the surroundings (lateral surface) of the light guiding layer, and the bottom surface of the second display 130 does not have a casing serving as a shielding object. Thus, an image capturing unit (not illustrated) included in the acquisition unit 105 can acquire an image from the back side (inside of the housing of the game device 100) of the second display unit 130, the image allowing the code of the article placed on the placement panel 131 to be extracted. At this point, the image capturing unit may be configured to enable capturing of both the code labeled to the game card with an invisible ink and the code labeled to the ticket, or the image capturing unit may include two kinds of image capturing units capable of capturing the respective codes. Also, the configuration of the second display unit 130 is not limited to this, and for example, even when a rear projection method is used, similarly, it is possible to capture an image allowing the code of the article placed on the placement panel 131 to be extracted.

Also, the presentation control unit 107 includes, for example, a circuit that outputs/amplifies an audio signal, such as a sound board and an amplifier, and performs predetermined processing when audio to be outputted from the audio output unit 140 is generated. Specifically, the presentation control unit 107 determines audio data to be outputted simultaneously, for example, based on audio data recorded on the recording medium 102, and performs audio output by converting (D/A conversion) the audio data into an electrical audio signal and outputs the signal to the audio output unit 140. The audio output unit 140 may be a predetermined speaker or the like, and outputs sound waves based on the inputted audio signal.

When a game provided by the game device 100 of the present embodiment is played in response to payment of a fee, the acquisition unit 105 acquires game information from the game card and the ticket placed on the placement panel 131, identifies multiple game cards for the game card, and detects at least one of the position, rotation, and movement. The acquisition unit 105 includes, for example, an image capturing unit that captures the second display unit 130 from the back side as described above, extracts and converts the code labeled to the article by applying predetermined calculation to the image obtained by the capturing, and acquire game information. In the present embodiment, different generation methods are used for the code labeled to the game card and the code labeled to the ticket, thus the calculation used for extraction and conversion of the code labeled to the game card and the calculation used for extraction and conversion of the code labeled to the ticket are different.

Figure 6A:
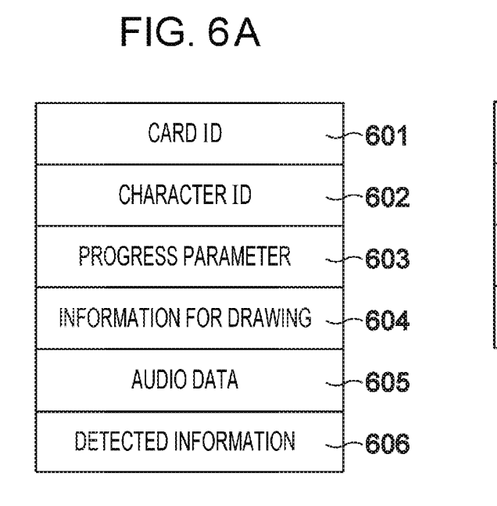
Figure 6B:
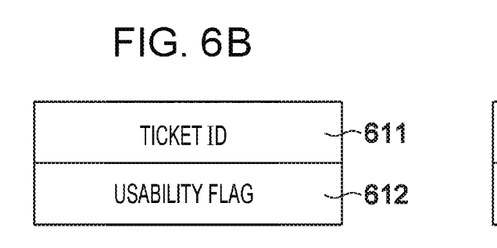

The game information acquired for each of the game card and the ticket is stored, for example, in the memory 103 as in-use card information and in-use ticket information. As illustrated in FIG. 6A, for each game card, the in-use card information manages a progress parameter 603, information for drawing 604, audio data 605, and detected information 606 indicating the state (at least one of position, rotation, and movement) on the placement panel 131 of a relevant character (a character corresponding to the card) acquired from the character DB 106 in association with a card ID 601 and a character ID 602 included in the game information of the card. Also, as illustrated in FIG. 6B, the in-use ticket information manages a usability flag 612 (Boolean type, true indicates usable) which indicates validity of the ticket in association with a ticket ID 611 included in the game information of the ticket.

It is to be noted that in the present embodiment, the acquisition unit 105 is configured to enable capturing of the entire area of the placement panel 131, and is configured to enable acquisition of information from the game card and the ticket placed at a position on the placement panel 131. In other words, the area on the placement panel 131 where acquisition of information from the game card and the ticket is performed is identical with the same shape and the same size, and at the timing of acquiring information from either article, a user only have to place the article on the placement panel 131. In the present embodiment, a description is given assuming that the entire area of the placement panel 131 is defined as the area for acquisition of information. However, the implementation of the present invention is not limited to this. The area for acquisition of information is not different among usable articles, the convenience of a user is guaranteed, thus for example, when a field allowing a movement operation on the game card is displayed on part of the area of the second display unit 130, an area, corresponding to the field, of the placement panel 131 may be defined as the area for acquisition of information from the game card and the ticket.

The character DB 106 is a database that manages information (character information) on each of predetermined characters who appear in the game. In the game provided by the game device 100 of the present embodiment, multiple in-use characters bodies of characters may appear in the game in a single game play. When a user uses a game card for a game play, in the game device 100, the characters associated with the card can be used (operated) by causing the characters to appear in the games as by the user.

Figure 6C:
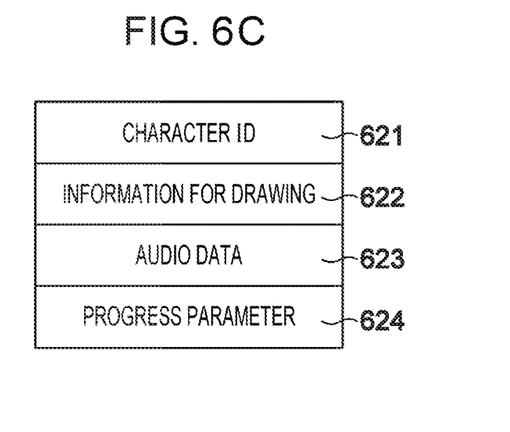

The character information managed for one character may have the data structure as illustrated in FIG. 6C, for example. As illustrated, in association with a character ID 621 that uniquely identifies a character, the character information includes information for drawing 622 including graphic data used for image generation when the character appears in the game, audio data 623 used for audio presentation similarly, and a progress parameter 624 which describes the element specific abilities, such as predetermined physical strength (endurance strength), offensive strength, defensive strength, driven technique, special skill in addition to the name of a character, an attribute as an example of reference information according to the present invention. The progress parameter 624 is information referenced in the game in which the characters appear, and the progress control of the provided game is performed by using the information.

It is to be noted that in the present embodiment, a description is given assuming that graphic data and audio data are stored in the character DB 106, and the character information includes these data. However, the implementation of the present invention is not limited to this. The character information may include information indicating the storage place of the relevant data.

Also, in the present embodiment, a description is given assuming that in the character DB 106, a character ID is associated with the character information managed for each character, and the in-use card information can be formed and registered by acquiring from the character DB 106 various types of information necessary for progress control of a game related to the character associated with the card based on the character ID of the game information acquired from the game card by the acquisition unit 105. However, the implementation of the present invention is not limited to this. In other words, the game information labeled to the game card may not include only the information for identifying various types of information necessary for progress control of the game, such as a character ID, and may include various types of information necessary for progress control of the game.

The provision control unit 108 normally performs control to provide one piece of game card for a single game play based on payment of a fee. The game card provided by the game device 100 is a game card which is provided before the start of a game sequence related to provision of a predetermined playgame (game part which operates an operation character, a fighting game) for example, in other words, basically, a game card labeled with predetermined (fixed) information for each card regardless of the play contents of the game. A card provision unit 150 is, for example, a card dispenser, and has a stocker (not illustrated) which stores game cards in the vertical direction, and may be configured to have a mechanism that provides one piece of game card held at the lowermost part of the stocker in response to a provision command issued by the provision control unit 108. When the card provision unit 150 is incorporated in the same housing for the game device 100, the provided game card may be provided to a user by being guided to a drawing slot 151 (see FIG. 1) which is accessible from the outside of the game device 100. Each game card provided from the game device 100 of the present embodiment is a ready-made card which has been manufactured by printing in advance, and the design, such as a character image and a parameter, printed on the surface of the game card is fixed, and all game cards are formed in the same shape and the same size.

It is to be noted that a description is given assuming that the game device 100 of the present embodiment provides ready-made cards having a fixed design, which have been printed, issued in a factory or the like in advance. However, the provided game cards may have dynamically changeable design by so-called on-demand printing. In this case, the card provision unit 150 is a printing device that performs printing on a predetermined paper medium, and it is sufficient that game information be formed which has the character ID of a character selected by a user or drawing processing, for example, according to the progress of the game, and a code obtained by converting the information by a conversion method for the game card be printed on the game card.

The operation input unit 109 is a user interface included in the game device 100, such as an operational member for direction input, an operational member for determination input, or various types of sensors, for example. When detecting that an operation input is made to an operational member, the operation input unit 109 outputs a control signal corresponding to the operation input to the control unit 101. It is to be noted that although a description is given assuming that the game device 100 includes various types of interfaces as physical operational members in the present embodiment, a touch input detection sensor or the like may be included, which detects touch input onto the screen of the second display unit 130, for example.

The communication unit 110 is a communication interface with an external device, included in the game device 100. The communication unit 110 is coupled to an external device via a network 300 (regardless of wired or wireless), and enables transmission and reception of data. The communication unit 110 converts, for example, information inputted as an object to be transmitted into data in a predetermined format, and transmits the information to an external device such as the server 200 via the network 300. Also, for example, when receiving information from an external device via the network, the communication unit 110 decodes the information and stores the information in the memory 103. Also, the game device 100 of the present embodiment is configured to be able to receive program data from an external device via the communication unit 110, the program data being obtained by packaging programs for processing related to the game. When the program data is received along with a program update request by the communication unit 110, the control unit 101 can update programs for processing related to the game according to the update request using the received program data, the programs being currently stored in the recording medium 102. It is to be noted that in addition, the update processing for the programs related to the game is automatically executed when the program data recorded on, for example, a recording medium is inserted in an optical drive (not illustrated) or the like included in the game device, or the update processing can be executed by an administrator issuing a start command after the insertion.

<Configuration of Sever 200>

Figure 3:
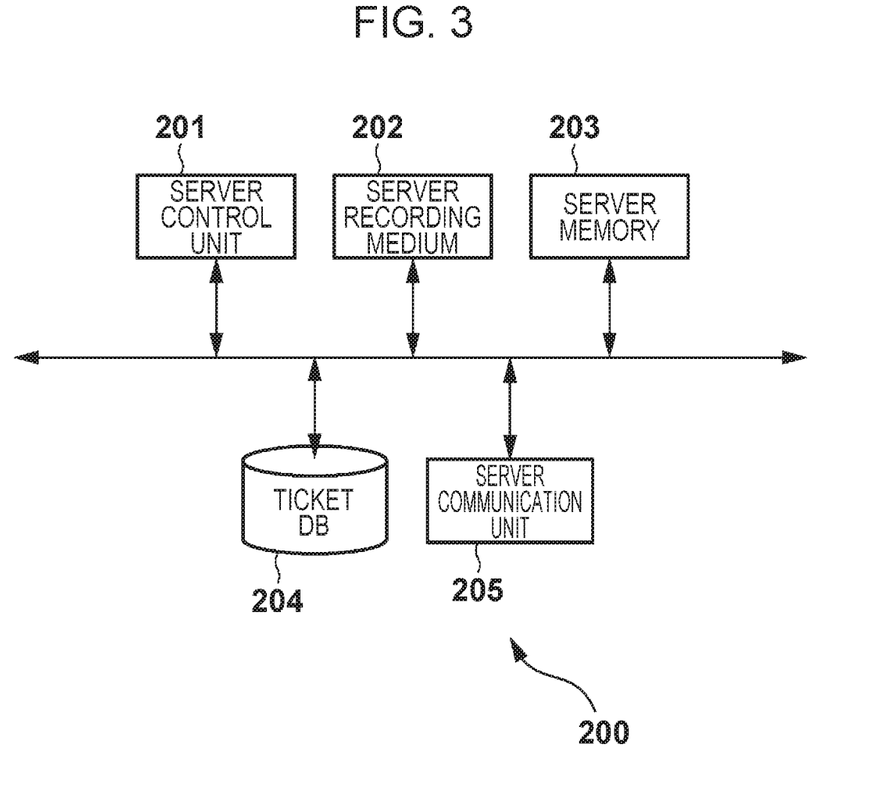
FIG. 3 is a diagram showing the functional configuration of a server 200 according to the embodiment of the present invention.

Next, the functional configuration of the server 200 will be described using the block diagram of FIG. 3. It is to be noted that the server 200 of the present embodiment does not have the structure shown by a dashed line in the block diagram of FIG. 3.

The server control unit 201 is, for example, a CPU, and controls the operation of each block included in the server 200. Specifically, the server control unit 201 reads the operation program of each block recorded on, for example, a server recording medium 202, loads the program into a server memory 203, and executes the program, thereby controlling the operation of each block.

The server recording medium 202 is a recording device, such as a non-volatile memory or a HDD, capable of holding data permanently. The server recording medium 202 stores information such as a parameter necessary for the operation of each block, in addition to the operation program of each block included in the server 200. The server memory 203 is a recording device used for temporary data storage such as a volatile memory, for example. The server memory 203 is used not only as a loading area for the operation program of each block, but also as a storage area which temporarily stores data or the like outputted in the operation of each block.

Figure 6D:
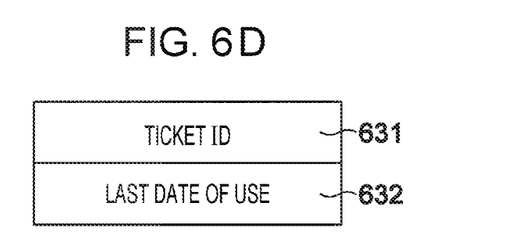

The ticket DB 204 is a database that manages information (ticket history information) on use status for each of distributed tickets. In the game system of the present embodiment, in order to guarantee the fairness, one ticket can be used for one game play per day regardless of which one of the game devices 100 is used. Thus, as illustrated in FIG. 6D, the ticket DB 204 manages a last date of use 632 in association with a ticket ID 631, the last date of use 632 indicating the date on which a ticket is used in one of the game devices 100 connected for communication with the server 200, and an element of interest corresponding to the last is provided. It is to be noted that for the sake of simplicity, a description is given assuming that information on the use status for each ticket is managed in the present embodiment. However, for example, in an aspect in which information on the play history is managed for each user about a game, in order to restrict use of ticket by one user to one time per day, the last date of use 632 is managed in the information on the play history of the user, and the last date of use 632 does not need to be managed for each ticket. Also, validity of use of ticket is not limited to an aspect in which determination is made every day, and, determination may be made according to whether or not a predetermined condition is met for the time when an element of interest was provided most recently, for example, according to whether or not a predetermined time has elapsed from the time when a corresponding element of interest was provided last.

The server communication unit 205 is a communication interface with an external device, included in the server 200. The server communication unit 205 is coupled to an external device via a network 300 (regardless of wired or wireless), and enables transmission and reception of data. The network 300 may be a cable that connects to a communication network such as the Internet or between devices. The server communication unit 205 converts, for example, information inputted as an object to be transmitted into data in a predetermined format, and transmits the information to an external device such as the game device 100 via the network 300. Also, for example, when receiving information from an external device via the network, the server communication unit 205 decodes the information and stores the information in the server memory 203.

It is to be noted that in the present embodiment, a description is given assuming that the sever 200 is provided with the ticket DB 204, and the information on the last date of use is managed so that even when a ticket is used in any one of the game devices 100, the validity of the ticket can be determined (a ticket used in another game device 100 is restricted from use on the same day). However, the implementation of the present invention is not limited to this. Determination of the validity of use may be made for each game device 100, and in this case, information on the last date of use may be managed by the game device 100 for which a ticket has been used, and the server 200 may not be provided. Also, when the ticket is formed as an information rewritable article, the ticket may be configured to enable determination of the validity of use at the time of acquisition of information by adding the information on the last date of use to the ticket.

<<Provision Processing>>

Figure 5:
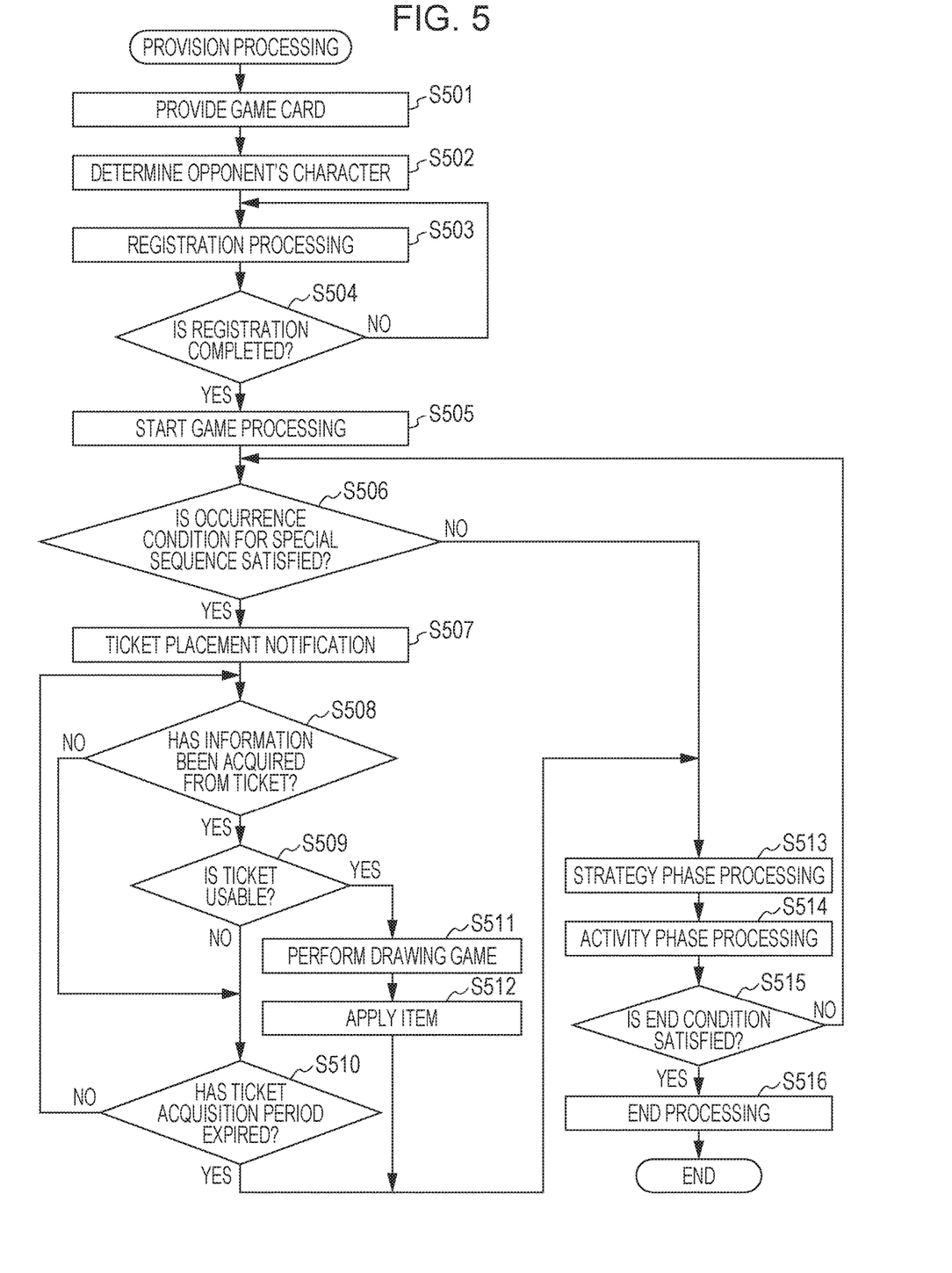
FIG. 5 is a flowchart illustrating provision processing performed by the game device 100 according to the embodiment of the present invention.

In the game device 100 in such a configuration of the present embodiment, specific processing for provision processing executed for provision of one play experience will be described using the flowchart of FIG. 5. The processing corresponding to the flowchart is implemented by the control unit 101 reading a corresponding processing program stored, for example, in the recording medium 102, loading the processing program into the memory 103, and executing the processing program. It is to be noted that a description is given assuming that the present game processing is started when the payment detection unit 104 detects that payment of a fee has been made, for example, in a period during which the game device 100 is in a stand-by state.

In S501, under the control of the control unit 101, the provision control unit 108 controls the card provision unit 150 so that a game card is provided for the payment of a fee at the start of the provision processing. Also, upon provision of the game card, the control unit 101 causes the presentation control unit 107 to notify that the game card is provided.

In S502, the control unit 101 determines opponent characters who appear in the current game play. A description is given assuming that the game provided by the game device 100 of the present embodiment is a fighting game between in-use characters (user's team) each activity-controlled based an operation of a user, and opponent characters who appear as NPC (Non-Player Character). The number of characters who appear in the fighting game is determined in advance for the in-use characters and the opponent characters, and in the step, the control unit 101 determines a necessary number of opponent characters, and adds and stores the information for fighting game related to the opponent characters into an opponent character management table of the memory 103. Determination of an opponent character may be made in response to an operation input of selecting one of predetermined opponent characters and requests associated with the opponent characters, or may be made according to the drawing processing and information on the play progress status of a user recorded on a separate recording medium without requiring an operation input.

It is to be noted that information of one record managed for one body of character in the opponent character management table may have the same structure as that of the in-use card information except that the detected information 606 is not included. It is sufficient that necessary information be acquired from the character DB 106 and stored based on the character IDs of the determined opponent characters.

In S503, the control unit 101 executes registration processing to register in-use characters of a user, who appear in the fighting game in the current game play. The registration processing is performed by placing the game card on the placement panel 131 of the second display unit 130, the game card being related to characters whom a user desires to appear as the user's team. In the registration processing, the acquisition unit 105 applies image processing to a captured image of the placement panel 131 to extract and convert a code (code in the first format) labeled to the game card, thereby performing detection of the game card and acquisition of corresponding game information. Even when a code (code in the second format) labeled to a ticket is present in the image, the processing applied at this point does not extract the code and does not perform conversion to resultant game information.

When change is made on the game card placed on the placement panel 131 (detection of a new game card, elimination of (due to removal of) a detected game card), the acquisition unit 105 performs corresponding processing (addition/deletion of in-use card information). For example, when a new game card is detected, the acquisition unit 105 acquires (acquisition of game information) a character ID related to an associated character by analyzing an invisible code labeled to the card, and outputs the character ID along with the detected coordinates and information on rotation of the card to the control unit 101. The control unit 101 acquires the relevant character information from the presentation control unit 107 based on the game information of the detected game card to form in-use card information, and adds and stores the information into an in-use character management table of the memory 103.

In S504, the control unit 101 determines whether or not registration of the in-use characters is completed. Completion of registration of the in-use characters may be determined based on detection of an operation input for completion of registration by a user, or completion of registration of an upper limit number (seven bodies) of the in-use characters. When determining that registration of the in-use characters is completed, the control unit 101 causes the processing to proceed to S505, and when determining that registration of the in-use characters is not completed yet, the control unit 101 causes the processing to proceed back to S503. Here, at the time of completion of registration, when the number of the in-use characters registered falls below a predetermined number, processing may be performed so that the number of the in-use characters reaches a predetermined number by selecting a character to be rented for the current fighting game by drawing processing or the like, and adding the information on the characters to the in-use character management table. At this point, the information of one record managed for one body of rented in-use character in the in-use character management table may be formed in such a manner that the detected information 606 is excluded from the in-use card information similarly to the information on the opponent characters, for example, in an aspect in which the character is activity-controlled by the control unit 101 regardless of a user's operation. Also, for example, in an aspect in which the second display unit 130 is a display device configured to be able to detect a touch operation, and (an image of) a virtual game card corresponding to the rented in-use character is presented in a movable manner by a touch operation, the information of one record may have the same configuration as that of the in-use card information.

In S505, the control unit 101 starts the game processing for the fighting game in which the registered in-use characters and opponent characters appear. More particularly, the control unit 101 refers to the in-use character management table and the opponent character management table, and starts game processing to perform progress control based on the progress parameter 603 of each character.

It is to be noted that the fighting game provided by the game device 100 of the present embodiment is played in round system. Basically, for each round, a strategy phase and an activity phase are performed by changing the arrangement of the game cards related to the in-use characters on the placement panel 131 by a user, where in the strategy phase, activities (such as offense, defense, charge) of the in-use characters performed in the round are determined, and in the activity phase, the activities of the in-use characters are performed based on the game card arrangement made in the strategy phase and the progress parameter 603 of each character. Also, the fighting game is completed under the condition that a predetermined number of rounds are finished, or as a result of the activity phase, either the in-use characters or the opponent characters are in a state of activity incapability (for example, the total physical strength is 0).

Also, in the device 100 of the present embodiment, when the progress status of a game satisfies a predetermined condition, an opportunity of acquisition of information from a ticket is provided, and a drawing game is executed as an element of interest based on the ticket, the drawing game not being generated in a normal game play. In the present embodiment, a drawing game is determined by drawing processing on a game element (item), and the status of an in-use character is changed to a status to which the item as a result of drawing is applied. The item which can be determined as a result of drawing has multiple types, which have different effects on the in-use character in the fighting game. However, basically, each item shall provide the effect of advantageously progressing the fighting game as compared with before the item is applied. Also, in order to avoid a prolonged play time, the opportunity of acquisition of information from a ticket is assumed to occur, for example, once during one game play, and the period during which the acquisition unit 105 is operated for acquisition of information from a ticket is generally shorter than the period during which the acquisition unit 105 is operated for acquisition of information from the game card in the registration of an in-use character and in the strategy phase.

In S506, the control unit 101 determines whether or not an occurrence condition for a special sequence for performing acquisition of information from a ticket is satisfied. When determining that the occurrence condition for a special sequence is satisfied, the control unit 101 causes the processing to proceed to S507, and when determining that the occurrence condition is not satisfied, the control unit 101 causes the processing to proceed to S513.

In S507, under the control of the control unit 101, the presentation control unit 107 can acquire information from a ticket, and presents a notification to at least one of the first display device 120, the second display device 130, and the audio output unit 140, the notification prompting for placement of a ticket on the placement panel 131. Also, the control unit 101 starts to measure an elapsed time for the period for acquisition of information from a ticket.

In S508, the control unit 101 determines whether or not acquisition of information from the ticket has been performed. The determination in the step is made according to whether or not the acquisition unit 105 has acquired game information based on a code labeled to the ticket, and the in-use ticket information has been stored in the memory 103. At this point, the acquisition unit 105 applies image processing to a captured image of the placement panel 131 to extract and convert a code (code in the second format) labeled to the ticket, thereby performing detection of the ticket and acquisition code of corresponding game information. Even when a code (in the first format) labeled to the game card is present in the image, the processing applied at this point does not extract the code and does not perform conversion to resultant game information. When determining that acquisition of information from the ticket is performed, the control unit 101 causes the processing to proceed to S509, and when determining that acquisition of information from the ticket is not performed, the control unit 101 causes the processing to proceed to S510. It is to be noted that when an operation input to skip acquisition of information from the ticket is performed, the control unit 101 causes the processing to proceed to S513.

In S509, the control unit 101 determines the validity of use of the ticket from which information has been acquired. Specifically, the control unit 101 sends the ticket ID 611 of the in-use ticket information stored in S508 to the communication unit 110, and causes the communication unit 110 to transmit the ticket ID 611 along with an information transmission request for the last date of use to the server 200. When receiving the request, the server control unit 201 sends the last date of use 632 of ticket history information back to the game device 100 via the server communication unit 205, the ticket history information being managed in the ticket DB 204 in association with the received ticket ID 611. When receiving the information on the last date of use of the ticket, via which information has been acquired, from the server 200, the control unit 101 determines the validity of use of the ticket based on whether or not the last date of use is the date of yesterday or a previous date. At this point, when the last date of use is the date of yesterday or a previous date, the control unit 101 sets the usability flag 612 of the in-use ticket information to True, and when the last date of use is the date of today (present), the control unit 101 sets the usability flag 612 to False. When determining that the ticket, via which information has been acquired, is usable, the control unit 101 causes the processing to proceed to S511, and when determining that the ticket is non-usable, the control unit 101 causes the processing to proceed to S510.

In S510, the control unit 101 determines whether or not a predetermined period for information acquisition from the ticket has expired. When determining that a predetermined period for information acquisition has expired, the control unit 101 causes the processing to proceed to S513. When determining that a predetermined period for information acquisition has not expired, the control unit 101 prompts for placement of a ticket again, and returns the processing to S508. At this point, when in-use ticket information with a false usability flag 612 is present, the control unit 101 also notifies that the ticket currently placed is already non-usable today.

In S511, the control unit 101 executes a drawing game based on the ticket from which information has been acquired. The drawing game of the present embodiment is performed by drawing one item from multiple items provided for the game based on a predetermined probability. When the drawing game is completed, in S512, the control unit 101 applies the one drawn item to one of the in-use characters. Application of an item may be performed by changing the progress parameter 603 of the relevant in-use character based on, for example, adjustment information defined for the item. At this point, an in-use character to which an item is applied may be determined by any one of the following techniques: an in-use character is determined based on a selection operation of a user, an in-use character is selected from the in-use characters by drawing processing, an in-use character which is set to have relevance to the item is selected.

In S513, the control unit 101 executes processing for the strategy phase. As described above, in the strategy phase, in order to receive an arrangement change operation for the game card on the placement panel 131, the acquisition unit 105 applies image processing to a captured image of the placement panel 131 to extract and convert a code in the first format, thereby performing acquisition of information of the game card and detection of a state. Thus, even when a code in the second format is present, a movement operation can be favorably detected similarly to a state in which the code is excluded.

When the strategy phase is completed, in S514, the control unit 101 executes the activity phase based on an operational result of the strategy phase, and when the activity phase for one round is completed, the control unit 101 causes the processing to proceed to S515.

In S515, the control unit 101 determines whether or not a completion condition for the fighting game is satisfied. When determining that the completion condition for the fighting game is satisfied, the control unit 101 causes the processing to proceed to S516, and when determining that the completion condition is not satisfied, the control unit 101 causes the processing to return to S506, and proceed to a sequence for the next round.

In S516, the control unit 101 executes various types of processing for completion of the fighting game, and finishes the provision processing. The various types of processing may include, for example, presentation of a game result by the presentation control unit 107, and transition processing to a stand-by status. Also, when in-use ticket information with a true usability flag 612 is present in the memory 103, the control unit 101 sends the ticket ID 611 of the in-use ticket information to the communication unit 110, and causes the communication unit 110 to transmit the ticket ID 611 along with an update request for the last date of use to the server 200. When receiving the request, the server control unit 201 updates the last date of use 632 of ticket history information to the date of today, the ticket history information being managed in the ticket DB 204 in association with the received ticket ID 611.

As described above, according to the game device 100 of the present embodiment, it is possible to switch between articles of multiple types placed on one placement panel 131 so as to perform acquisition of information only from the article of one of the types according to the progress of a game. Thus, it is possible to avoid operational delay caused by analysis processing of the multiple types, and to provide a favorable play experience.

It is to be noted that for the sake of simplicity, a description is given assuming that the opportunity of acquisition of information from a ticket in one game play is given just once in the present embodiment. However, the implementation of the present invention is not limited to this. The opportunity may be given multiple times according to the progress of a game, or control may be performed to change the probability of selection in a drawing game and the value (advantage in a game) of a selected item by allowing information to be acquired from a ticket once out of multiple times. Also, the item selected by a drawing game is not required to be applied to the in-use characters in the currently performed game play, and for example, the item may be associated with information which is managed for each user so that the item is applicable to a game play from the next time. Also, an element selected by a drawing game is not limited to an item usable in a game. For example, the element may be implemented by providing an additional game card or the right (presentation on the screen at the time of game end, or an exchange ticket) of exchange with a predetermined article.

Also, the element of interest provided by the article (ticket) of the second type described in the present embodiment is only an illustration, and not limited to the above-described drawing game. It should be easily understood that various changes may be made.

Other Embodiments

The present invention is not limited to the embodiment described above, and various changes and modifications may be made without departing from the spirit and scope of the present invention. Also, the game device according to the present invention can be implemented by a program that causes a computer to function as the game device. The program can be provided/distributed by being recorded on a computer-readable recording medium, or via an electric communication line.

REFERENCE SIGNS LIST

100 GAME DEVICE
101 CONTROL UNIT
102 RECORDING MEDIUM
103 MEMORY
104 PAYMENT DETECTION UNIT
105 ACQUISITION UNIT
106 CHARACTER DB
107 PRESENTATION CONTROL UNIT
108 PROVISION CONTROL UNIT
109 OPERATION INPUT UNIT
110 COMMUNICATION UNIT
120 FIRST DISPLAY UNIT
130 SECOND DISPLAY UNIT
131 PLACEMENT PANEL
140 AUDIO OUTPUT UNIT
150 CARD PROVISION UNIT
151 DRAWING SLOT
200 SERVER
201 SERVER CONTROL UNIT
202 SERVER RECORDING MEDIUM
203 SERVER MEMORY
204 TICKET DB
205 SERVER COMMUNICATION UNIT
300 NETWORK

What is claimed is:

1. A game device, comprising:
a board surface configured to allow an article of a first type and an article of a second type different from the article of the first type to be placed;
an acquisition unit configured to, for the article of the first type and the article of the second type placed on the board surface, acquire first game information associated with the article of the first type or second game information associated with the article of the second type;
an execution unit configured to execute a game based on the first game information acquired by the acquisition unit; and
a setting unit configured to set the acquisition unit to one of a first state and a second state, the first state in which the first game information is acquired from the article of the first type, the second state in which the second game information is acquired from the article of the second type, wherein
in a period during which setting to the first state is made, the acquisition unit further detects one of a position, rotation, and movement of the article of the first type on the board surface, and
in a period during which setting to the second state is made, the acquisition unit does not detect rotation and movement of the article of the second type on the board surface.

2. He game device according to claim 1, wherein the first game information and the second game information are acquired via processing in different methods, in the first state, the acquisition unit performs acquisition of information from an article without performing processing for acquiring the second game information, and in the second state, the acquisition unit performs acquisition of information from an article without performing processing for acquiring the first game information.

3. He game device according to claim 2, wherein the acquisition unit includes an image capturing unit that acquires image information by capturing an image from a back surface of the board surface, the image information being an object to which the processing of different methods is applied.

4. He game device according to claim 1, wherein in the first state and the second state, acquisition of information is performed by the acquisition unit on a same area on the board surface.

5. The game device according to claim 1, wherein the acquisition unit performs acquisition of the first game information and the second game information under a condition that payment of a fee is made.

6. The game device according to claim 1, further comprising
a presentation unit configured to present a presentation element of the game, wherein when the acquisition unit is set to the second state, the presentation unit presents that acquisition of information from the article of the second type is possible.

7. The game device according to claim 1, wherein the first game information is held in the article of the first type as a code in a first format, and the second game information is held in the article of the second type as a code in a second format different from the code in the first format.

8. The game device according to claim 1, further comprising a provision unit configured to provide an article, wherein the article of the first type is an object to be provided by the provision unit, whereas the article of the second type is not an object to be provided by the provision unit.

9. A game device, comprising:
a board surface configured to allow an article of a first type and an article of a second type different from the article of the first type to be placed;
an acquisition unit configured to, for the article of the first type and the article of the second type placed on the board surface, acquire first game information associated with the article of the first type or second game information associated with the article of the second type;
an execution unit configured to execute a game based on the first game information acquired by the acquisition unit; and
a setting unit configured to set the acquisition unit to one of a first state and a second state, the first state in which the first game information is acquired from the article of the first type, the second state in which the second game information is acquired from the article of the second type, wherein
the execution unit further executes a drawing game different from the game under a condition that the second game information is acquired.

10. He game device according to claim 9, wherein the drawing game provides a game element according to a result of drawing, and the game element provided according to the result of the drawing is different in type from a game element which appears in the game based on the first game information.

11. The game device according to claim 9, wherein when the second game information is acquired, in the case where a date or a time of most recent execution of the drawing game in response to acquisition of the second game information does not satisfy a predetermined condition, the execution unit does not execute the drawing game.

12. A game system, comprising:
a game device that executes processing related to a game; and
an article of a first type and an article of a second type difference from the article of the first type which are configured to enable acquisition of information by the game device,
wherein the game device includes:
a board surface configured to allow the article of the first type and the article of the second type to be placed;
an acquisition unit configured to, for the article of the first type and the article of the second type placed on the board surface, acquire first game information associated with the article of the first type or second game information associated with the article of the second type;
an execution unit configured to execute a game based on the first game information acquired by the acquisition unit; and
a setting unit configured to set the acquisition unit to one of a first state and a second state, the first state in which the first game information is acquired from the article of the first type, the second state in which the second game information is acquired from the article of the second type, wherein
in a period during which setting to the first state is made, the acquisition unit further detects one of a position, rotation, and movement of the article of the first type on the board surface, and
in a period during which setting to the second state is made, the acquisition unit does not detect rotation and movement of the article of the second type on the board surface.

\* \* \* \* \*